United States Patent [19]

Clement

[11] Patent Number: 5,152,703
[45] Date of Patent: Oct. 6, 1992

[54] FOOT PEDAL TO BOAT DECK FASTENING SYSTEM

[75] Inventor: Tim Clement, Starkville, Miss.

[73] Assignee: Zebco Corporation, Tulsa, Okla.

[21] Appl. No.: 558,256

[22] Filed: Jul. 24, 1990

[51] Int. Cl.⁵ .............................................. B60L 15/20
[52] U.S. Cl. ...................................... 440/7; 114/153; 74/480 B; 74/512
[58] Field of Search ........ 114/144 R, 144 ER, 144 A, 114/153; 440/6, 7, 70, 74, 79; 74/478, 480 B, 481, 512, 560; 428/100

[56] References Cited

U.S. PATENT DOCUMENTS

| | | | |
|---|---|---|---|
| D. 288,288 | 2/1987 | Hentzschel et al. | D8/380 |
| 2,968,273 | 1/1961 | Corbett et al. | 114/153 |
| 3,370,818 | 2/1968 | Perr | 428/100 |
| 3,664,628 | 5/1972 | Noble | 74/560 |
| 4,964,820 | 10/1990 | Rayborn | 440/7 |

Primary Examiner—Ed Swinehart
Attorney, Agent, or Firm—Wood, Phillips, Van Santen, Hoffman & Ertel

[57] ABSTRACT

A foot pedal to boat deck fastening system comprises a bracket mountable to a boat deck and a two-piece fastener. Each fastener piece has releasable, self-fastening connector elements on one face which fasten the two pieces when the pieces are pressed together and which release the two pieces when the two pieces are pulled apart, and a self-adhesive on an opposite surface for securing one piece to the bracket and the other piece to the foot pedal so that the foot pedal can be fastened to the boat deck by fastening the two pieces together.

13 Claims, 2 Drawing Sheets

FOOT PEDAL TO BOAT DECK FASTENING SYSTEM

FIELD OF THE INVENTION

This invention relates to trolling motor systems and, more particularly, to a fastening system for fastening a foot pedal to a boat deck.

BACKGROUND OF THE INVENTION

Trolling motors have long been used by fisherman and other boaters as an auxilary motor on a boat for propelling the boat short distances and to provide precise positioning of the boat. Some trolling motors are hand operated while others offer a combination of hand and foot operation.

One known form of trolling motor includes a foot pedal including a pivotal foot pad connected to a rigid cable. Pivoting the foot pad moves the rigid cable which is connected to a rack and pinion in a trolling motor control head to rotate the trolling motor to provide steering. Speed control is effected electrically by a horizontal sliding movement of the foot pad to rotate a knob which actuates a potentiometer forming part of a speed control circuit.

The foot pedal is typically positioned on the boat so that it is easily usable by the fisherman to provide an aid in fishing, rather than a hinderance. Often, the foot pedal is merely rested on the deck with reliance on the weight of the foot pedal to maintain positioning of the same. To avoid undesired movement of the foot pedal, which could damage the foot pedal, it is desirable to secure the foot pedal to the boat during rough water running, yet be easy for a customer to install and also to remove for cleaning and the like.

The present invention is directed to solving one or more of the problems discussed above in a novel and simple manner.

SUMMARY OF THE INVENTION

In accordance with the invention, there is disclosed herein a foot pedal to boat deck fastening system.

Broadly, there is disclosed herein a fastening system comprising a bracket mountable to a boat deck, and a two-piece fastener. Each piece has releasable, self-fastening connector elements thereon which fasten the two pieces when the two pieces are pressed together and which release the two pieces when the two pieces are pulled apart. One piece is secured to the bracket and the other piece is secured to the foot pedal so that the foot pedal can be fastened to the boat deck by fastening the two pieces together.

It is a feature of the invention that the bracket comprises a metal bracket.

It is another feature of the invention that the bracket has an upturned forward edge for aligning with the forward edge of the foot pedal.

It is a further feature of the invention that the upturned edge includes a notch and the foot pedal includes a forwardly extending tab for placement in the notch to provide lateral alignment of the foot pedal relative to the bracket.

It is still another feature of the invention that the upturned edge includes a pair of laterally spaced notches and the foot pedal includes a pair of forwardly extending laterally spaced tabs for placement in the notches to provide lateral alignment of the foot pedal relative to the bracket.

It is yet another feature of the invention that the two pieces including securing surfaces provided with a layer of self-adhesive for securing to the bracket and to the foot pedal.

It is still a further feature of the invention that the two pieces comprise elongate strips There is disclosed herein in accordance with a further aspect of the invention a fastening system comprising a bracket mountable to a boat deck and a two-piece fastener. Each piece has releasable, self-fastening connector elements on one face which fasten the two pieces when the pieces are pressed together and which release the two pieces when the two pieces are pulled apart, and a self-adhesive on an opposite surface for securing one piece to the bracket and the other piece to the foot pedal so that the foot pedal can be fastened to the boat deck by fastening the two pieces together.

Further features and advantages of the invention will readily be apparent from the specification and from the drawings.

DESCRIPTION OF THE INVENTION

Figure 1:
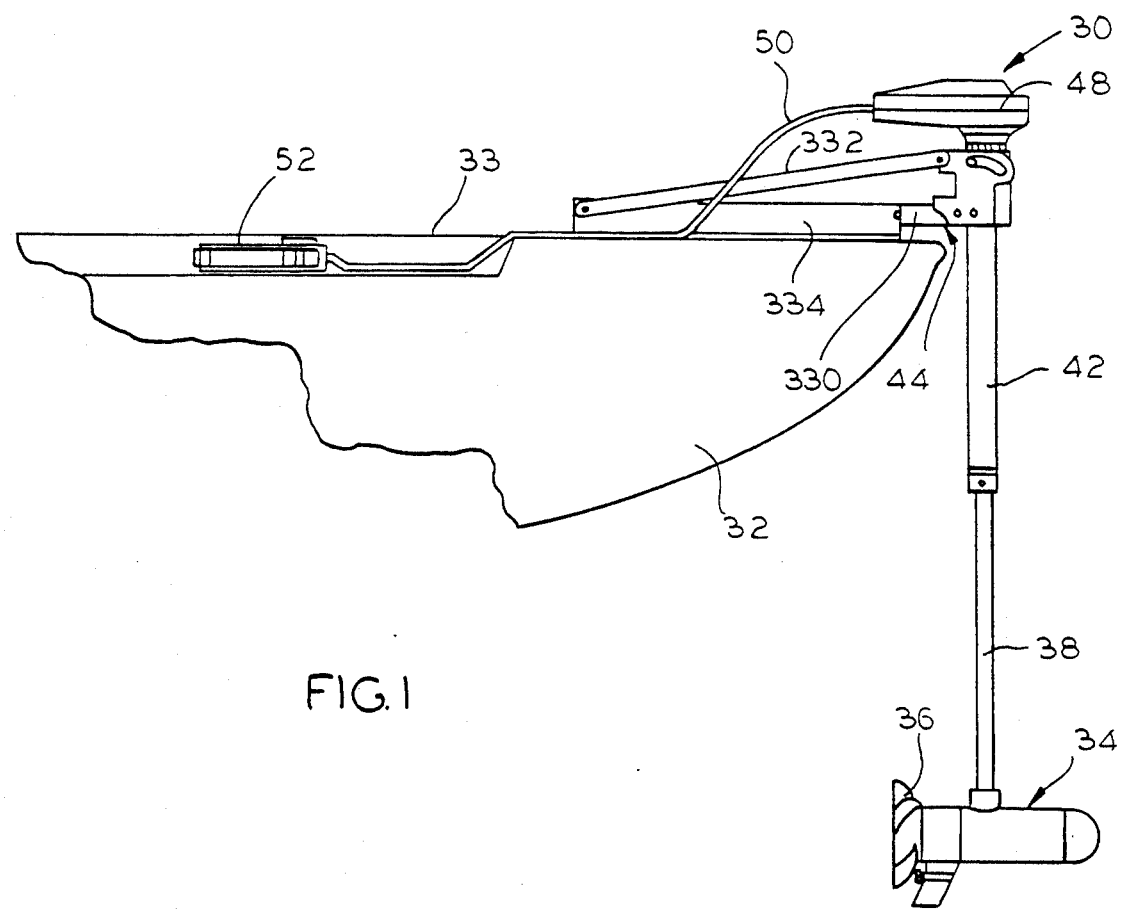
FIG. 1 is a partial, side elevation view of the bow of a boat including a trolling motor and foot pedal with a foot pedal to boat deck fastening system in accordance with the invention.
Figure 2:
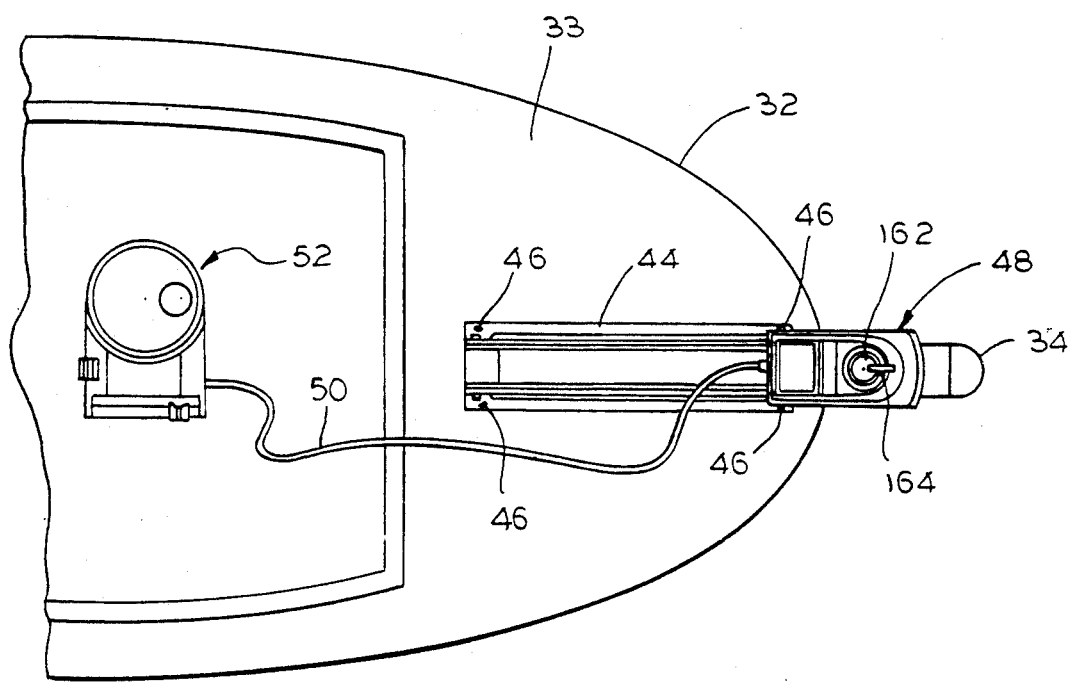
FIG. 2 is a partial plan view of the bow of the boat of FIG. 1.

With reference to FIGS. 1 and 2, a trolling motor system 30 in accordance with the invention is illustrated for use in connection with a boat 32 having a deck 33. Particularly, the system 30 is shown mounted at the bow of the boat 32 to effect propulsion and steering of the boat 32. Alternatively, the system 30 could be stern mounted, as is apparent to those skilled in the art.

The system 30 includes a trolling motor 34 having a propeller 36 rotatably driven thereby. The motor 34 is connected to a rotating tube, or column, 38 rotatably received in a fixed tube 42. The fixed tube 42 is mounted to the boat deck 33 using a four bar linkage mechanism 44 secured as by fasteners 46 to the deck 33. The linkage mechanism 44 is movable between an operative position shown in FIG. 1, with the column generally vertical, and a stowed position, with the column 38 generally horizontal and resting on a deck channel on the boat deck 33.

A control head 48 is mounted at the upper end of the fixed tube 42 and includes suitable circuitry and a gear drive for controlling speed of the trolling motor 34 as well as direction of the trolling motor 34 for steering. A multiconductor cable 50 connects the control head 48 to a deck mounted foot pedal 52. The foot pedal 52 may be operated by a user sitting on the boat deck 33 to control steering and speed of the trolling motor 34, and thus the boat 32.

Figure 3:
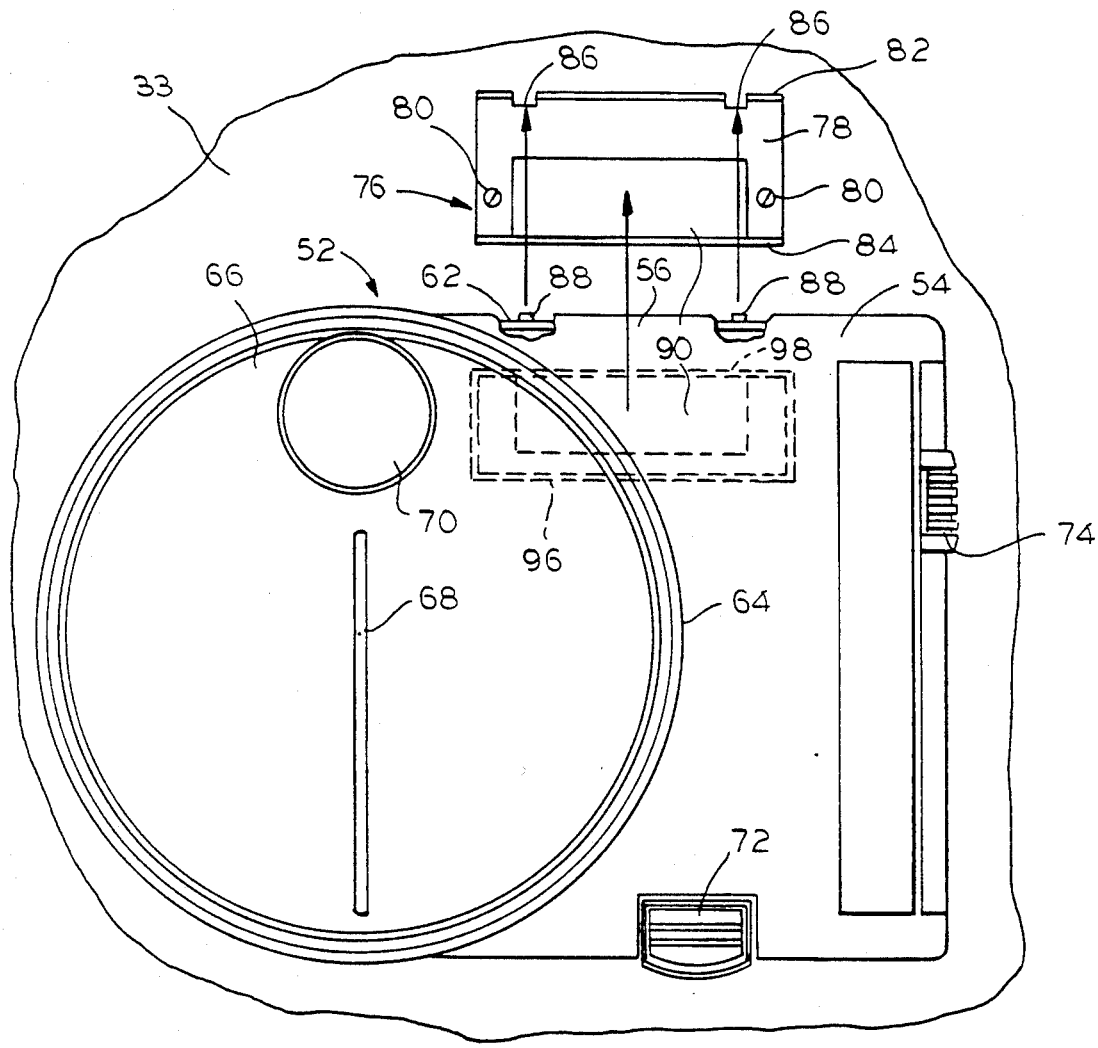
FIG. 3 is a plan view particularly illustrating the fastening system according to the invention.
Figure 5:
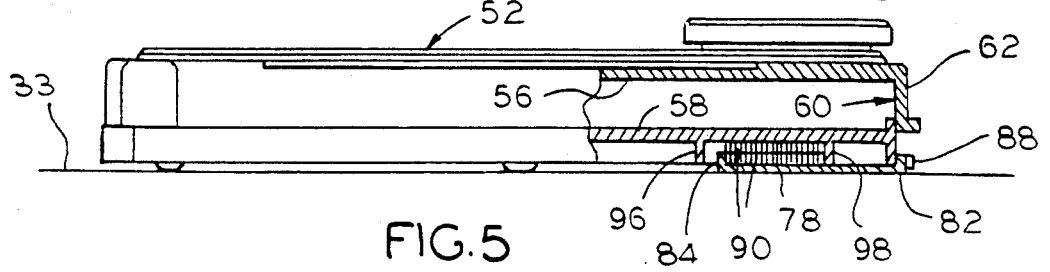
FIG. 5 is a side, partially cutaway, view illustrating the fastening system with the foot pedal fastened to the boat deck.

With reference to FIG. 3, the foot pedal 52 comprises a fixed base member 54 which may be mounted to the deck 33 at any selected position. The base member 54 includes parallel spaced top and bottom walls 56 and 58, see also FIG. 5, connected by a perimeter wall 60 including a forward wall 62. One side of the perimeter wall 60 is hemispherical, as at 64, for providing space for receiving a rotary turntable 66 pivotally secured to the base 54 at a rotational axis 68.

Although not described in detail herein, the foot pedal 52 includes suitable sensing devices for sensing rotational movement of the turntable 66 about the axis 68 to effect steering of the trolling motor 34, and switches enabled by a momentary actuator 70 disposed on the turntable 66, and a slide actuator 72 connected to the base 54 for energizing the trolling motor 34. Further, a slide actuator 74 is also connected to the base 54 and includes suitable sensing elements for sensing position of the actuator 74 for controlling speed of the trolling motor 34.

In accordance with the invention, a fastening system 76 is provided for fastening the foot pedal 52 to the boat deck 33.

The fastening system includes a bracket or deck plate 78 fastened to the boat deck 33 using suitable fasteners, such as screws 80. The bracket 78 may comprise a metal bracket or may be of any construction suitable to withstand forces that might be applied thereto. The bracket 78 includes an upturned front edge 82 and an upturned rear edge 84. The front edge 82 includes a pair of laterally spaced notches 86 used for aligning the foot pedal 52, as discussed below.

The foot pedal 52 includes a pair of forwardly extending laterally spaced tabs 88 extending from the forward wall 62. The lateral spacing of the tabs 88 corresponds to the lateral spacing of the notches 86. The tabs 88 are used for aligning the foot pedal 52 relative to the bracket 78 during the fastening procedure.

A two-piece fastener comprising a pair of like pieces 90 is used for fastening the bracket 78 to the foot pedal 52. Each piece 90 comprises an elongate rectangular patch or strip having releasable, self-fastening connector elements 92 on one face which fasten the two pieces 90 together when the pieces 90 are pressed together and which release the two pieces when the two pieces 90 are pulled apart. A self-adhesive layer is provided on an opposite surface 94 of each piece 90 for securing one piece to the bracket 78 and the other piece to the foot pedal 52. Particularly, the first piece 90 secured to the bracket 78 is aligned with one edge thereof abutting the rear upturned edge 84 of the bracket 78. The bottom wall 58 of the foot pedal 52 is provided with a rectangular wall 96 defining an area in which the second piece 90 should be placed. Particularly, the second piece 90 should advantageously be placed along a forward wall 98 to provide proper alignment with the first piece 90 which is adhered to the bracket 78.

The two-piece fastener may comprise one of a plurality of commercially available such fasteners, such as, for example, DUAL LOCK ® fasteners (DUAL LOCK is a registered trademark of Minnesota Mining and Manufacturing Company).

Figure 4:
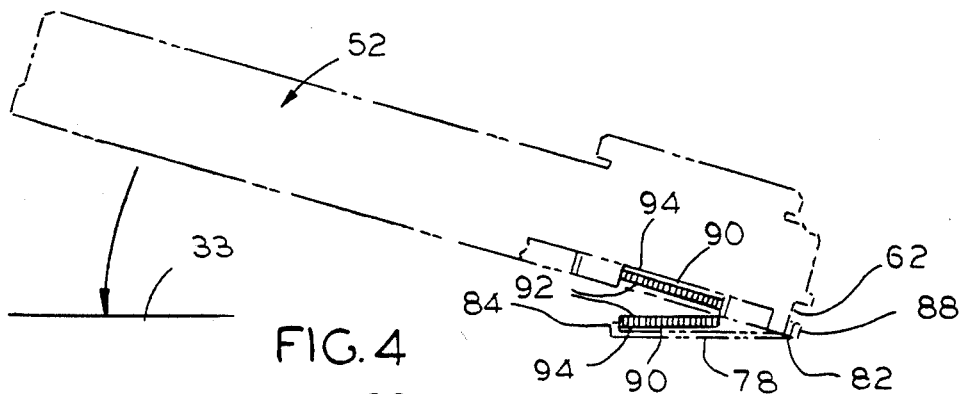
FIG. 4 is a side elevation view illustrating the foot pedal fastening system in a released state.

With the bracket 78 fastened to the deck 33, the foot pedal 52 can be fastened to the deck 33 by first angling the foot pedal forwardly and downwardly, as shown in FIG. 4, and inserting the tabs 88 into the bracket notches 86 with the foot pedal front wall 62 abutting the bracket upturned edge 82. In so doing, the fastener pieces 90 are laterally and longitudinally aligned with one another. The foot pedal 52 can then be pivoted downwardly and "snapped" down so that the two pieces 90 when pressed together provide a secure lock to maintain the foot pedal 52 fastened to the boat deck 33. If necessary, the foot pedal can be removed by pulling up on the rear edge of the foot pedal 52 and "peeling" the foot pedal up as by the connecting elements 92 on the pieces 90 releasing when so pulled apart.

Thus, the fastening system permits ease of use and provides a secure fastening of the foot pedal 52 to the boat deck 33. Further, if it is desirable to mount the foot pedal 52 in different positions, it is possible that a plurality of brackets 78 could be mounted at different positions on the boat deck 33 with the foot pedal 52 then being mounted to one of the select such brackets 78.

The illustrated embodiment of the invention is illustrative of the broad inventive concepts comprehended hereby.

I claim:

1. In a trolling motor system including a trolling motor, means mounting the trolling motor to a boat and a foot pedal for controlling operation of said trolling motor, a foot pedal to boat deck fastening system comprising:
   a bracket mountable to a boat deck; and
   a two piece fastener, each piece having releasable, self fastening connector elements thereon which fasten said two pieces when said two pieces are pressed together and which release said two pieces when said two pieces are pulled apart, one piece being secured to said bracket and the other piece being secured to said foot pedal so that said foot pedal can be fastened to the boat deck by fastening said two pieces together.

2. The fastening system of claim 1 wherein said bracket comprises a metal bracket.

3. The fastening system of claim 1 wherein said bracket has an upturned forward edge for aligning with a forward edge of the foot pedal.

4. The fastening system of claim 3 wherein said upturned edge includes a notch and the foot pedal includes a forwardly extending tab for placement in said notch to provide lateral alignment of the foot pedal relative to the bracket.

5. The fastening system of claim 3 wherein said upturned edge includes a pair of laterally spaced notches and the foot pedal includes a pair of forwardly extending laterally spaced tabs for placement in said notches to provide lateral alignment of the foot pedal relative to the bracket.

6. The fastening system of claim 1 wherein said two pieces include securing surfaces provided with a layer of self adhesive for securing to said bracket and to said foot pedal.

7. The fastening system of claim 1 wherein said two pieces comprise elongate strips.

8. A trolling motor foot pedal fastening system comprising:
   a trolling motor foot pedal;
   a bracket mountable to a boat deck; and
   a two piece fastener, each piece having releasable, self fastening connector elements on one face which fasten said two pieces when said pieces are pressed together and which release said two pieces when said two pieces are pulled apart, and a self adhesive on an opposite surface for securing one piece to said bracket and the other piece to said foot pedal so that said foot pedal can be fastened to the boat deck by fastening said two pieces together.

9. The fastening system of claim 8 wherein said bracket comprises a metal bracket.

10. The fastening system of claim 8 wherein said bracket has an upturned forward edge for aligning with a forward edge of the foot pedal.

11. The fastening system of claim 10 wherein said upturned edge includes a notch and the foot pedal includes a forwardly extending tab for placement in said notch to provide lateral alignment of the foot pedal relative to the bracket.

12. The fastening system of claim 10 wherein said upturned edge includes a pair of laterally spaced notches and the foot pedal includes a pair of forwardly extending laterally spaced tabs for placement in said notches to provide lateral alignment of the foot pedal relative to the bracket.

13. The fastening system of claim 8 wherein said two pieces comprise elongate strips.

* * * * *